(12) United States Patent
Kim et al.

(10) Patent No.: US 7,633,200 B2
(45) Date of Patent: Dec. 15, 2009

(54) MOTOR

(75) Inventors: Duck-Young Kim, Suwon-si (KR); Ta-Kyoung Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/882,587

(22) Filed: Aug. 2, 2007

(65) Prior Publication Data

US 2008/0036302 A1 Feb. 14, 2008

(30) Foreign Application Priority Data

Aug. 8, 2006 (KR) ............... 10-2006-0074563
Feb. 20, 2007 (KR) ............... 10-2007-0016902

(51) Int. Cl.
*H02K 5/16* (2006.01)
(52) U.S. Cl. ........................................ 310/90
(58) Field of Classification Search ........... 310/90, 310/90.5
See application file for complete search history.

(56) References Cited

U.S. PATENT DOCUMENTS

| 5,558,445 | A  | * | 9/1996  | Chen et al. ............ 384/132 |
| 6,674,201 | B2 | * | 1/2004  | Liu et al. ............. 310/91  |
| 6,836,040 | B2 | * | 12/2004 | Watanabe et al. ....... 310/90  |
| 2005/0225187 | A1 | * | 10/2005 | Hafen et al. ........... 310/90  |

FOREIGN PATENT DOCUMENTS

| JP | 8-70555 | 3/1996 |
| KR | 1998-069703 | 10/1998 |

OTHER PUBLICATIONS

Office Action mailed on May 19, 2008 and issued in corresponding Korean Patent Application No. 10-2007-0061902.

* cited by examiner

*Primary Examiner*—Nguyen N Hanh

(57) ABSTRACT

A motor is disclosed. The motor, which includes a stationary member, a rotating member coupled to the stationary member that rotates about an imaginary rotational axis, a plate coupled to or mounted on the rotating member to support the rotating member, a cap covering at least a portion of the plate to form a predetermined space between the plate and the cap, and fluid placed in the space between the plate and the cap, may maintain a uniform pressure in its interior to increase stability and provide an increased sealing effect.

16 Claims, 7 Drawing Sheets

MOTOR

CROSS-REFERENCE TO RELATED APPLICATIONS

This application claims the benefit of Korean Patent Application No. 10-2006-0074563 filed with the Korean Intellectual Property Office on Aug. 8, 2006, and to Korean Patent Application No. 10-2007-0016902 filed with the Korean Intellectual Property Office on Feb. 20, 2007, the disclosures of which are incorporated herein by reference in their entirety.

BACKGROUND

1. Technical Field

The claimed invention relates to a motor.

2. Description of the Related Art

In general, the spindle motor is currently widely used in electronic products that require precision rotating devices such as projection TV's, home theater equipment, and computer drives. The spindle motor provides several advantages such as that it has a small size, thereby allowing high-speed rotation, easy precision control, and low power consumption, etc., so that its use is expected to increase well into the future.

However, in the case of a spindle motor having the conventional bearing structure, the oil in which the bearing is immersed may leak to the exterior, to degrade the performance of the motor. When the oil is leaked, problems may occur in high-speed rotation, and abrasion may occur due to friction caused in a high-temperature state. If this state is prolonged, the duration of the spindle motor may be reduced, and noise and vibration may be increased to incur inconveniences in use, in addition to which malfunctions may occur in the entire electronic product having the spindle motor.

Thus, there is a need for improvements in the prevention of oil leakage, i.e. improvements in sealing performance.

SUMMARY

An aspect of the claimed invention is to provide a motor that offers high stability and an increased sealing effect, by forming a radial seal between a protrusion and the plate surface that prevents leaking in the fluid bearing and by forming a contiguous hole in the sleeve.

One aspect of the claimed invention provides a motor, which includes a stationary member, a rotating member coupled to the stationary member that rotates about an imaginary rotational axis, a plate coupled to or mounted on the rotating member to support the rotating member, a cap covering at least a portion of the plate to form a predetermined space between the plate and the cap, and fluid placed in the space between the plate and the cap.

The stationary member may include a sleeve in which a penetration hole is formed, and the rotating member may include a shaft which may be inserted in the penetration hole. The plate may have a first hole which corresponds to a cross-section of the shaft and which has a donut shape, where the plate may be coupled with the shaft such that the shaft is inserted in the first hole and may be mounted on one side of the sleeve.

The cap may cover an outer perimeter and a surface of the plate, and may include a protrusion protruding towards the plate from a portion covering a surface of the plate.

An inner perimeter of the cap may include a concavely curved surface.

The protrusion may be made with a convexly curved surface, and the protrusion and the inner perimeter of the cap may be connected by a curved surface. A radial seal may be formed between the protrusion and the surface of the plate to prevent leakage of the fluid.

The motor may further include a base cover covering one side of the rotating member. The base cover may include a material that may be elastically deformed when pressed to touch the stationary member or the rotating member.

The sleeve may include a ledge, such that a portion of the side of the sleeve on which the plate and the cap are mounted is sunken in or protruded out, in order for a more secure joining.

A first thrust bearing may be placed in a gap between the plate and the sleeve, where the first thrust bearing may be connected to the fluid in the space between the plate and the cap. In one embodiment, the motor may include a base cover covering the other side of the sleeve, where a radial bearing connected to the first bearing may be placed in a gap between the sleeve and the shaft, and a second thrust bearing connected to the radial bearing may be placed in a gap between the sleeve and the base cover.

The first thrust bearing and the second thrust bearing may be connected by a contiguous hole, where the contiguous hole may be formed to penetrate the sleeve.

However, the sleeve may also include an inner sleeve, in which the contiguous hole may be formed, and an outer sleeve coupled to an outer perimeter of the inner sleeve to house the inner sleeve, with the contiguous hole formed in a gap between the inner sleeve and the outer sleeve.

Here, the contiguous hole may be formed in the outer sleeve, and may be shaped as a conduit formed in an inner perimeter of the outer sleeve in a longitudinal direction.

Another aspect of the invention provides a motor which includes a stationary member, a rotating member coupled to the stationary member that rotates about an imaginary rotational axis, a plate coupled to or mounted on the rotating member to support the rotating member, a base cover covering one side of the rotating member and the stationary member, and a cap covering at least a portion of the plate, and which further includes fluid filled continuously in a space extending between the cap and the plate, between the plate and the stationary member, between the stationary member and the rotating member, and between the rotating member and the base cover.

The stationary member may include a sleeve in which a penetration hole is formed, and the rotating member may include a shaft which may be inserted in the penetration hole. The plate may have a first hole which corresponds to a cross-section of the shaft and which has a donut shape, where the plate may be coupled with the shaft such that the shaft is inserted in the first hole and may be mounted on one side of the sleeve.

The cap may be shaped to cover an outer perimeter and a surface of the plate, and may include a protrusion protruding towards the plate from a portion covering a surface of the plate. Also, an inner perimeter of the cap may include a concavely curved surface.

A radial seal may be formed between the protrusion and the surface of the plate that prevents the fluid from leaking.

Additional aspects and advantages of the invention will be set forth in part in the description which follows, and in part will be obvious from the description, or may be learned by practice of the invention.

DETAILED DESCRIPTION

The motor according to certain embodiments of the invention will be described below in more detail with reference to the accompanying drawings, in which those components are rendered the same reference number that are the same or are in correspondence, regardless of the figure number, and redundant explanations are omitted.

In general, a motor consists basically of a rotating member, a stationary member that supports the rotating motion of the rotating member, and a bearing placed between the rotating member and the stationary member. For example, the rotating member may be a coupled body including a shaft, a hub coupled to and rotating together with the shaft, and a plate, etc., and the stationary member may be a sleeve, etc., surrounding the shaft.

However, the rotating member and the stationary member are not determined by the components per se, but are determined by their designed functions. That is, there may be cases where the shaft is fixed and the sleeve surrounding the shaft is rotated, in which case the shaft may become the stationary member and the sleeve the rotating member.

In the embodiments of the invention described below, the descriptions will be set forth for the cases where the sleeve acts as the stationary member and the shaft and the plate and hub coupled to the shaft serve act as the rotating member. However, it is to be appreciated that the embodiments of the claimed invention are not thus limited.

Figure 1:
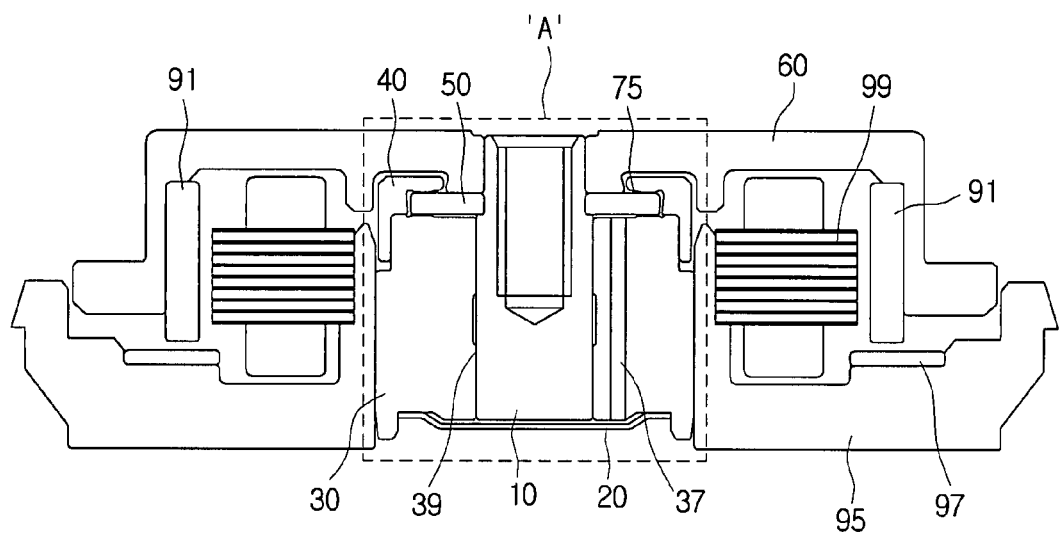
FIG. 1 is a cross-sectional view illustrating the structure of a motor according to a first disclosed embodiment of the invention.
Figure 2:
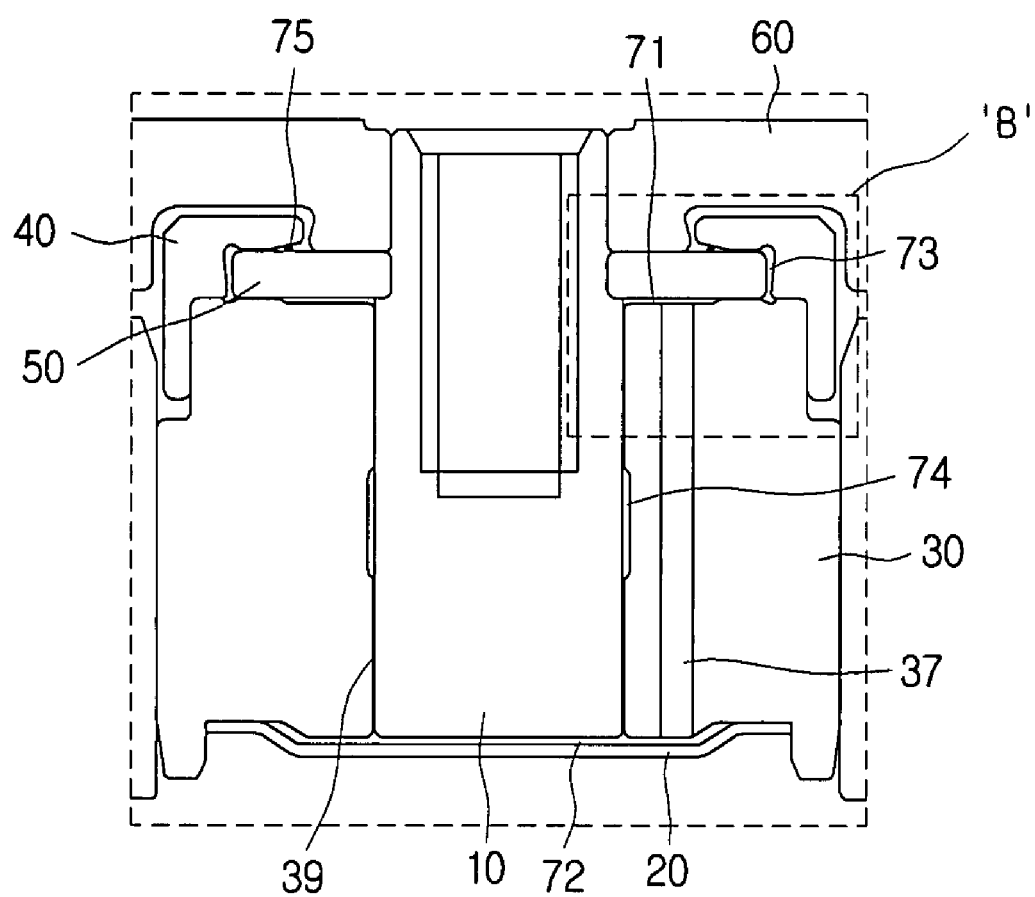
FIG. 2 is a magnified cross-sectional view of portion 'A' of FIG. 1.
Figure 3:
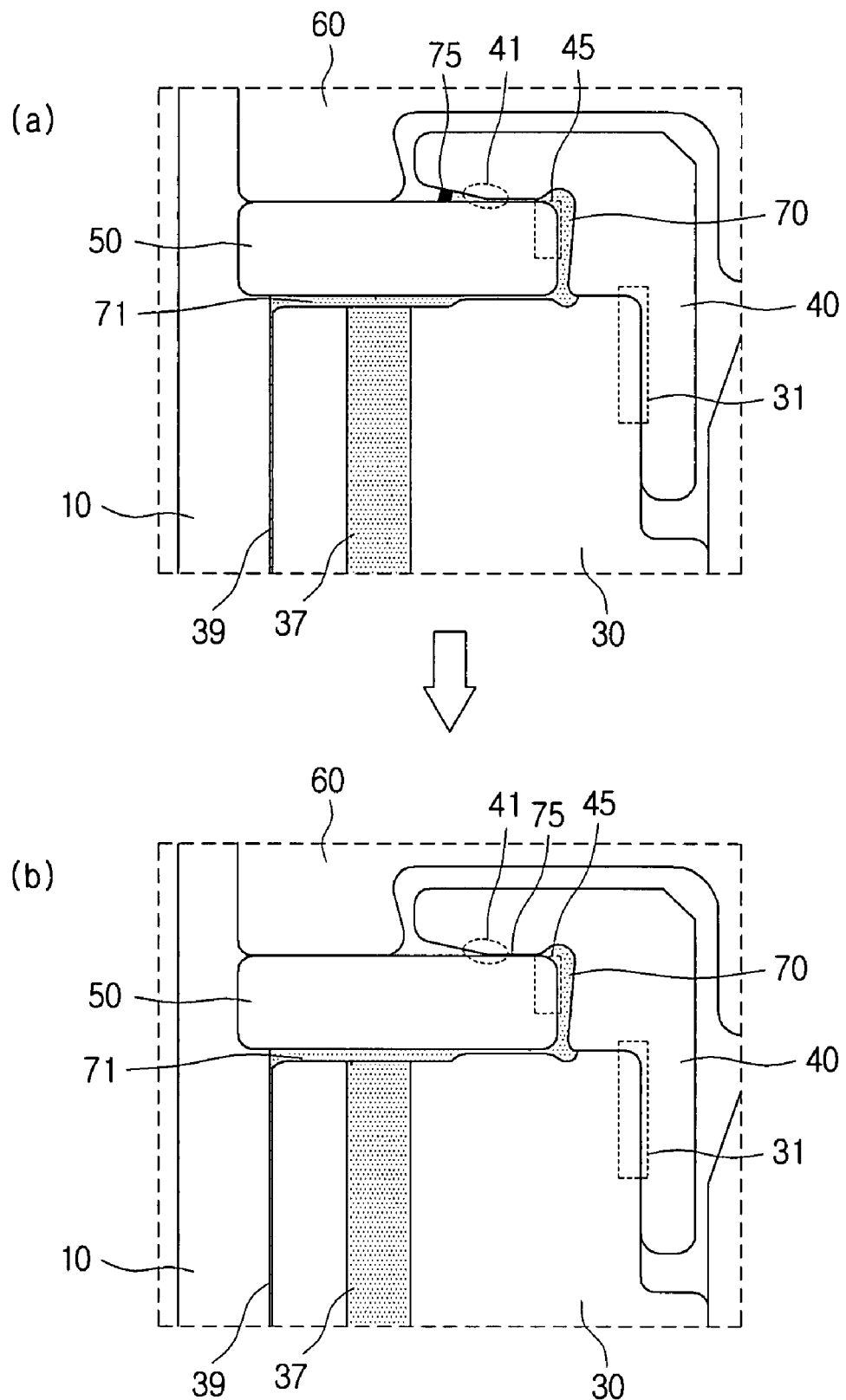
FIG. 3 is a magnified cross-sectional view of portion 'B' of FIG. 2.

FIG. 1 is a cross-sectional view illustrating the structure of a motor according to a first disclosed embodiment of the invention, FIG. 2 is a magnified cross-sectional view of portion 'A' of FIG. 1, and FIG. 3 is a magnified cross-sectional view of portion 'B' of FIG. 2. In FIGS. 1 to 3 are illustrated a shaft 10, a base cover 20, sleeve 30, contiguous hole 37, penetration hole 39, cap 40, protrusion 41, plate 50, hub 60, cap bearing 73, radial seal 75, permanent magnets 91, base 95, magnets 97, and electromagnet parts 99.

The shaft 10 may be the central axis for rotational motion, and may rotate together as a single body with the hub 60 described later. The shaft 10 may be inserted into the penetration hole 39 of the sleeve 30 described below.

The sleeve 30 may cover the outer perimeter of the shaft 10 to maintain stable rotating movement of the shaft 10. A penetration hole 39 is formed in the sleeve 30 through which the shaft 10 may be inserted, and as the shaft 10 is inserted in the penetration hole 39 and covered, the shaft 10 may be supported by the sleeve 30 during the rotating movement. A radial bearing, which will be described below, may be placed in the gap between the sleeve 30 and the shaft 10.

The radial bearing 74 may be a fluid bearing, which may be placed in the gap between the sleeve 30 and the shaft 10, and may support the shaft 10 during the rotating movement of the shaft 10 to maintain stable rotating movement of the shaft 10. The radial bearing 74 may be formed by injecting oil in the gap between the shaft 10 and sleeve 30. However, while oil is suggested in this embodiment for forming the radial bearing 74, it is apparent that various alternatives may be used according to design requirements.

Figure 7:
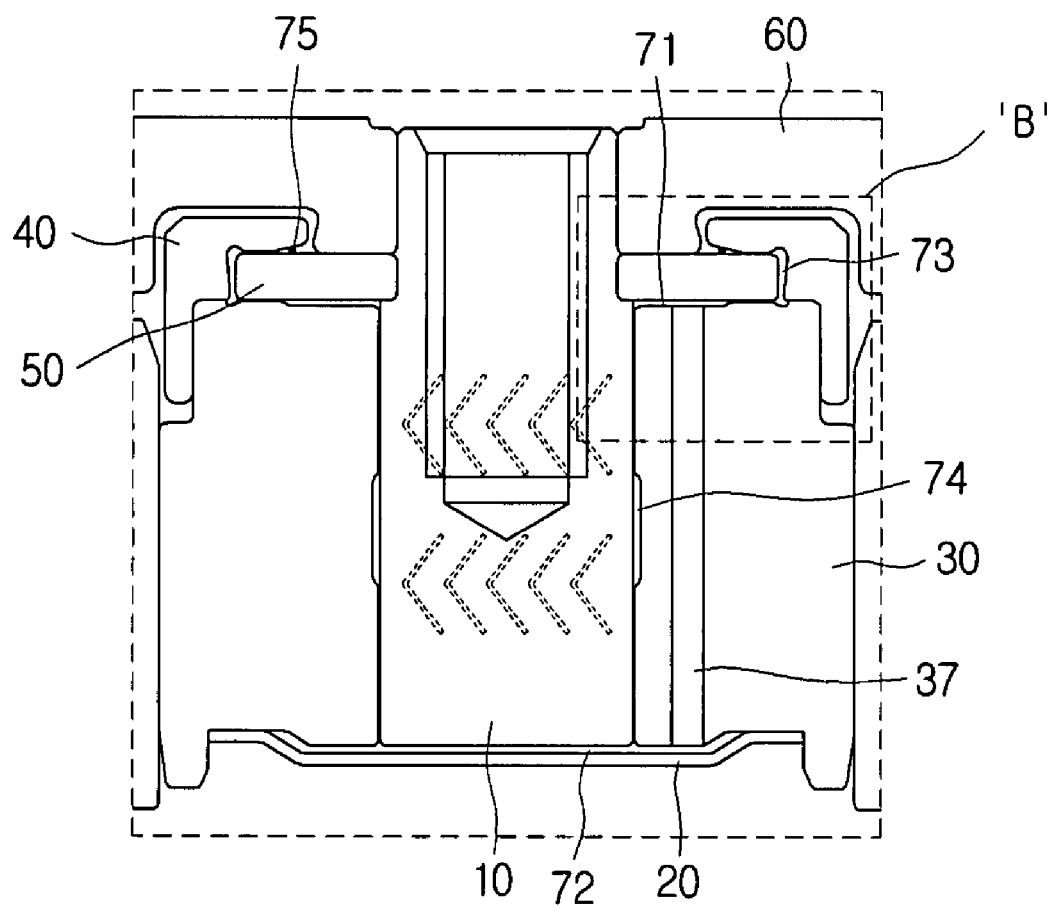
FIG. 7 is a cross-sectional view illustrating the motor according to the first disclosed embodiment of the invention with fluid dynamic grooves.

In order to increase the operational efficiency of the radial bearing, fluid dynamic grooves 12 may be formed on the surface of the shaft, as illustrated in FIG. 7. Due to the fluid dynamic grooves 12, the flow of the fluid forming the radial bearing may be regulated towards a predetermined direction when the motor is operated, where this flow of the fluid may provide fluid pressure, i.e. dynamic pressure, in a more efficient manner.

Such fluid dynamic grooves 12 may be formed by a chemical method, such as etching, or may also be formed by a physical method, such as laser processing, etc. Also, the fluid dynamic grooves may be formed to have a herringbone shape or a spiral shape, etc.

While in this embodiment, the case is suggested of the fluid dynamic grooves 12 being formed on the surface of the shaft, it is apparent that the fluid dynamic grooves may just as well be formed on the inner wall of the sleeve facing the shaft, and that the shape, size, and number, etc., of the fluid dynamic grooves may be varied as necessary.

The base cover 20 may cover the penetration hole 39 on the other side of the shaft 10. The base cover 20 may be coupled to one side of the sleeve 30 and may have a shape that is in correspondence with the shape of the side of the sleeve 30 to which the base cover 20 is coupled.

In addition, the base cover 20 may be made with a material that can be elastically deformed. Thus, during the assembly of a motor according to this embodiment, the shaft 10 can be inserted into the penetration hole 39 of the sleeve 30 easily and with precision, by applying a load on the base cover 20. A thrust bearing 72, which will be described later, may be interposed in the gap between the base cover 20 and the sleeve 30.

The thrust bearing 72 may be a fluid bearing, which may be placed in the gap between the base cover 20 and the sleeve 30. The thrust bearing 72 may support the shaft 10 in the axial direction to maintain an adequate rotating movement of the shaft 10.

The thrust bearing 72 may be formed by injecting oil in the gap between the sleeve 30 and the base cover 20, and may be connected with the radial bearing 74 described above. That is, the gap between the sleeve 30 and the base cover 20 may be contiguous with the gap between the sleeve 30 and the shaft 10, and the oil injected in each may flow freely and circulate around the bearings. However, while oil is suggested in this embodiment for forming the thrust bearing 72, it is apparent that various alternatives may be used according to design requirements.

In order to increase the operational efficiency of the thrust bearing 72, fluid dynamic grooves (not shown) may be formed on the surface of the base cover or on the inner wall of the sleeve facing the base cover. Due to the fluid dynamic grooves (not shown), the flow of the fluid forming the thrust bearing 72 may be regulated towards a predetermined direction when the motor is operated, where this flow of the fluid may provide fluid pressure, i.e. dynamic pressure, in a more efficient manner. As the method of forming and shape of these fluid dynamic grooves are similar to those set forth above, detailed explanations on this matter will not be provided.

The plate 50 may have the shape of a donut having a first hole in the center that is in correspondence with the cross-section of the shaft 10. The shaft 10 is inserted and coupled in the first hole, and one side of the plate 50 is mounted on one side of the sleeve 30.

While the plate 50 may be manufactured separately and then coupled with the shaft 10, the plate 50 may also be manufactured as a single body with the shaft 10 from the beginning of its manufacture, and may undergo rotating motion in accordance with the shaft 10 when the shaft 10 is rotated. A thrust bearing 71, which will be described later, may be interposed in the gap between the plate 50 and the sleeve 30.

The thrust bearing 71 may be a fluid bearing, which may be placed in the gap between the plate 50 and the sleeve 30. The thrust bearing 71 may support the plate 50, reduce friction between the plate 50 and the sleeve 30, and allow stable movement.

In order to increase the operational efficiency of the thrust bearing 71, fluid dynamic grooves (not shown) may be formed on the lower surface of the plate or on the upper surface of the sleeve facing the plate. Due to the fluid dynamic grooves (not shown), the flow of the fluid forming the thrust bearing 71 may be regulated towards a predetermined direction when the motor is operated, where this flow of the fluid may provide fluid pressure, i.e. dynamic pressure, in a more efficient manner. As the method of forming and shape of these fluid dynamic grooves are similar to those set forth above, detailed explanations on this matter will not be provided.

The thrust bearing 71 may be formed by injecting oil in the gap between the plate 50 and the sleeve 30, and may be connected with the radial bearing 74 described above. That is, the gap between the plate 50 and the sleeve 30 may be contiguous with the gap between the sleeve 30 and the shaft 10, and the oil injected in each may flow freely and circulate around the bearings. Thus, the thrust bearing 71, radial bearing 74, and thrust bearing 72 may all be contiguous. While oil is suggested in this embodiment for forming the thrust bearing 71, it is apparent that various alternatives may be used according to design requirements.

The cap 40 may cover the outer perimeter and one side of the plate 50 to form a bearing space with the outer perimeter part 45 of the plate 50, and may be mounted on one side of the sleeve 30. Here, the outer perimeter part of the plate 50 refers to the edge portion of the plate, including the perimeter of the one side and the outer perimeter surface of the plate 50, as can clearly be seen from reference numeral 45 of FIG. 3.

The cap 40 may have a shape that is in correspondence with the shape of the side of the sleeve 30 on which the cap 40 is mounted. Specific examples of such will be given later during the description on the shape of the side of the sleeve 30.

On the portion of the cap covering one side of the plate 50, a protrusion 41 may be formed that is protruded towards the plate 50. With the protrusion 41 formed on the cap 40, the gap between the cap 40 and the one side of the plate 50 may be made minimum at a predetermined point along the diametral direction of the plate 50, with the gap increasing again at positions further from the minimum point.

By use of the protrusion 41, the gap between the cap 40 and the one side of the plate 50 may be made minimum at a predetermined point, whereby leakage may be reduced of the fluid that composes the cap bearing 73, which will be described later, and also the flow of the fluid may be controlled. A description of the flow of the fluid that composes the cap bearing 73 will be presented later in more detail.

The protrusion 41 may be made to have a concavely curved surface and may be connected by a curved surface with the inner perimeter of the cap that confines the bearing space. By forming the protrusion 41 to have a concavely curved surface, the fluid that composes the cap bearing 73, which will be described later, can be made to flow adequately, so that ultimately the rotating movement of the motor may be kept stable.

A cap bearing 73 is placed in the bearing space confined by the outer perimeter part 45 of the plate 50 and the cap.

The cap bearing 73 may be a fluid bearing, which may be formed by injecting oil in the bearing space, and may be connected with the thrust bearing 71 described above. That is, the gap between the plate 50 and the sleeve 30 may be contiguous with the bearing space, and the oil injected in each may flow freely and circulate around the bearings. Thus, the thrust bearing 71, radial bearing 74, thrust bearing 72, and cap bearing 73 may all be contiguous. While oil is suggested in this embodiment for forming the cap bearing 73, it is apparent that various alternatives may be used according to design requirements.

The cap bearing 73 may support the outer perimeter and the one side of the plate 50, and may maintain stable rotating movement of the plate 50. These functions of the cap bearing will be discussed below in further detail.

When the motor is operated, dynamic pressure may be provided due to the thrust bearing 71 on the plate 50, whereby the plate 50 may be made to rise. Such rising of the plate can become a factor in causing unstable operation of the motor.

When the plate is thus made to rise, a portion of the fluid (in this embodiment, oil) that is in the bearing space formed by the cap 40 can be positioned, due to the concavely curved surface of the cap, at a relatively higher position than the plate, and may apply pressure in a direction that suppresses the rising of the plate. In other words, the plate can be supported by the fluid residing in the bearing space formed by the cap. Thus, stable rotating motion may be maintained for the plate.

The fluid residing in the bearing space formed by the cap 40 may thus also serve as a bearing that supports the plate 50. In addition, the fluid in the bearing space may also act as a fluid reservoir for replenishing and supply, when the fluid composing the thrust bearing 71 is lost by way of evaporation, etc.

Between the protrusion 41 and the surface of the plate 50, a radial seal 75 may be formed to prevent the leaking of oil that composes the cap bearing 73. The radial seal 75 may be formed between the protrusion 41 and the surface of the plate 50 to act as a stopper that prevents the oil forming the cap bearing 73 from leaking. According to this embodiment, the leakage of oil may be prevented not by using a separate material other than oil, but by using the capillary action and surface tension obtained with the shape of the cap described above.

The hub 60 may be coupled to one side of the shaft 10 and may be formed to extend in a direction perpendicular to the axis of the shaft 10. The hub 60 may receive driving power from a driving power generator composed of permanent magnets 91 and electromagnet parts 99, to undergo rotating motion, at which the shaft 10 may also be made to undergo rotating motion in accordance with to the rotation of the hub 60.

While a set of permanent magnets 91 and electromagnet parts 99 formed adjacent to the permanent magnets 91 coupled to the hub 60 has been suggested as a driving power generator, it is apparent that the components of the driving power generator and the coupling location of each component may be varied according to design requirements.

Various rotational bodies may be coupled to the outer perimeter of the hub 60, as necessary. For example, in the case of an LSU (laser scanning unit), a rotating polygonal mirror may be coupled, while in the case of a hard disk drive, a disk may be coupled.

Also, referring to FIG. 1, a magnet 97 may be coupled adjacent to a permanent magnet 91 coupled to an end portion of the hub. Here, the magnet 97 may be magnetized such that an attraction is generated with the permanent magnet 91 coupled to the hub 60. In this way, the hub 60 can apply pressure on the plate 50, and the motor may operate in a stable manner. This operation of the motor will be discussed later in more detail.

As described above, the sleeve 30 may cover the outer perimeter of the shaft 10 to maintain stable rotating movement of the shaft 10. A penetration hole 39 is formed in the sleeve 30 through which the shaft 10 may be inserted, and as the shaft 10 is inserted in the penetration hole 39 and covered, the outer perimeter of the shaft 10 may be supported by the sleeve 30 during the rotating movement.

A ledge 31 may be formed on the sleeve 30 such that the side on which the plate 50 and the cap are mounted is protruded out, and conversely, a ledge 32 may be formed such that the side on which the plate 50 and the cap are mounted is sunken in. The cap may be formed to be in correspondence with the shape of the side of the sleeve 30.

In FIG. 3, it is seen that a ledge 31 is formed such that the side of the sleeve 30 on which the plate 50 and the cap are mounted is protruded out. In correspondence with the shape of the sleeve 30, the cap is formed with a shape that covers all of the outer perimeter part of the plate 50 and the ledge. This may allow convenient coupling of the sleeve 30 with the plate 50 and cap, and may also provide secure coupling.

Figure 6:
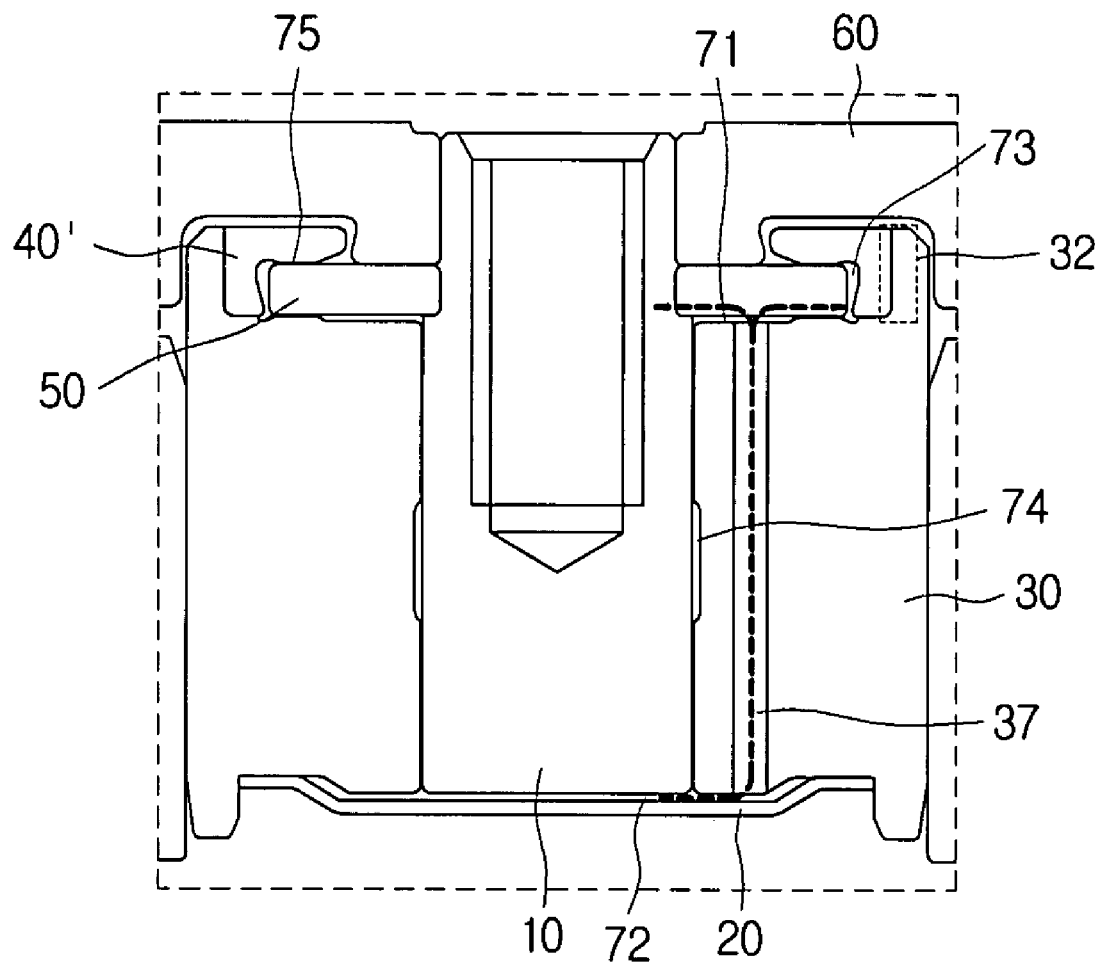
FIG. 6 is a cross-sectional view illustrating the structure of a motor according to a fourth disclosed embodiment of the invention.

In another embodiment, referring to FIG. 6, it is seen that a ledge 32 is formed such that the side of the sleeve 30 on which the plate 50 and the cap are mounted is sunken in. In correspondence with the shape of the sleeve, the cap 40' is shaped such that the cap 40' covers the outer perimeter part of the plate 50, while the outer perimeter of the cap 40' is covered by the ledge 32. This may allow convenient coupling of the sleeve 30 with the plate 50 and cap 40', and may also provide secure coupling.

In a predetermined position on the sleeve 30, a contiguous hole 37 may be formed that connects the thrust bearing 71 and the thrust bearing 72. The oil composing the thrust bearing 71 and the oil composing the thrust bearing 72 may adequately circulate through the contiguous hole 37, whereby not only can the pressure created in each fluid bearing within the motor be made uniform, but also bubbles, etc., can be moved by the circulation to the vicinity of the radial seal 75 where they may readily be released. The dotted lines and arrows represent the direction of movement of bubbles. In this manner, the stability of the motor may be improved.

Figure 4:
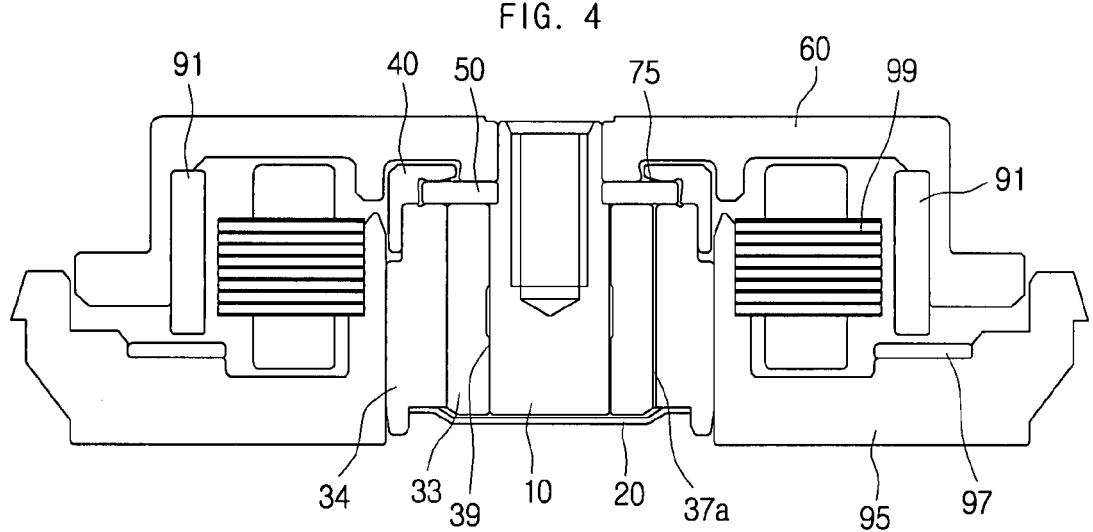
FIG. 4 is a cross-sectional view illustrating the structure of a motor according to a second disclosed embodiment of the invention.

In still another embodiment, referring to FIG. 4, a motor may be presented in which the sleeve 30 includes an inner sleeve 33 in which the penetration hole 39 is formed, and an outer sleeve 34 coupled to the outer perimeter of the inner sleeve 33 to house the inner sleeve 33, where a contiguous hole 37a is formed in the gap between the inner sleeve 33 and the outer sleeve 34.

When it is difficult to form the penetration hole 39 by processing, due to the material or structural properties of the inner sleeve 33, the inner sleeve 33 and the outer sleeve 34 coupled to the outer perimeter of the inner sleeve 33 for housing the inner sleeve 33 may be formed, and the contiguous hole 37a may be formed in the gap between the inner sleeve 33 and outer sleeve 34. This structure may also provide similar results to those of forming the contiguous hole 37 as described above.

Figure 5:
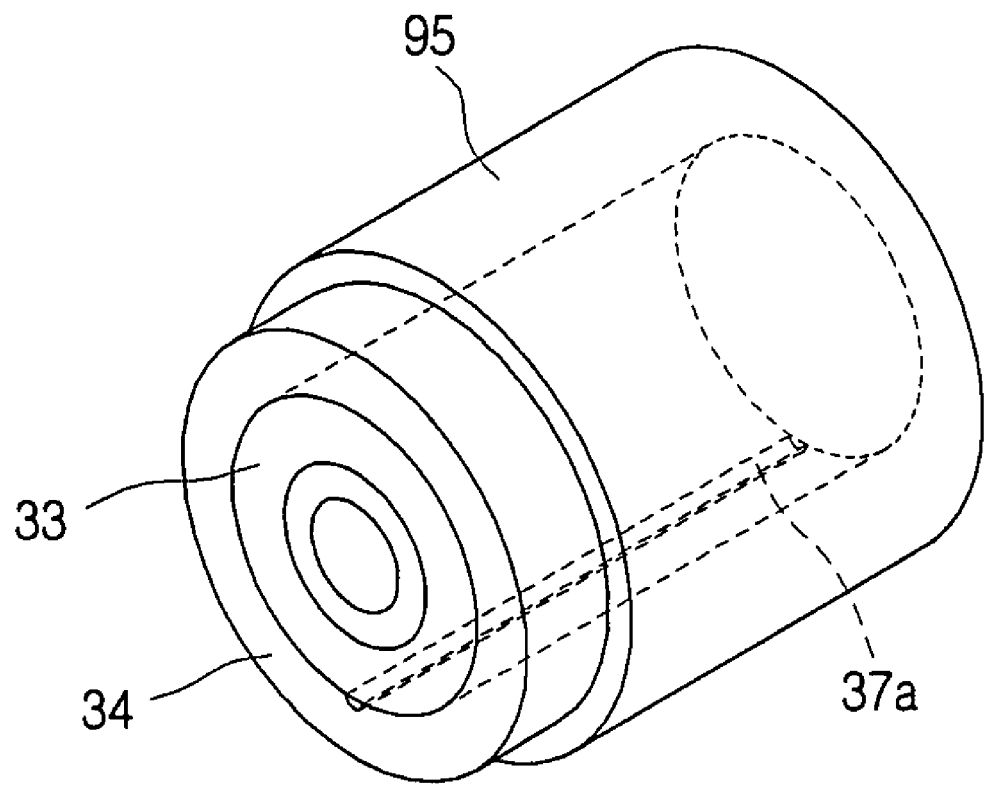
FIG. 5 is a perspective view illustrating a contiguous hole of a motor according to a third disclosed embodiment of the invention.

In yet another embodiment, referring to FIG. 5, a motor may be presented in which a contiguous hole 37b may be formed in the outer sleeve 34, by forming a conduit in a longitudinal direction in the inner perimeter of the outer sleeve 34. As the contiguous hole 37b can be formed simply by forming a conduit in the inner perimeter of the outer sleeve 34 and coupling the inner sleeve 33, the process of forming the contiguous hole 37b may be simplified. It is apparent that the shape and position of the conduit may vary according to design requirements.

Furthermore, it is also apparent that a contiguous hole may be formed which penetrates the outer sleeve 34.

As has been described earlier, the fluid inside the bearing space between the cap 40 and the plate 50, the fluid forming the thrust bearing 71 between the plate 50 and the sleeve 30, the fluid forming the radial bearing 74 between the shaft 10 and the sleeve 30, and the fluid forming the thrust bearing 72 between the shaft 10 and the base cover 20 are all interconnected. This connection to one another allows circulation, to provide the effects of making the pressure uniform, etc.

To achieve this in a more efficient manner, the fluid may be filled in continuously in the contiguous space between the cap 40 and plate 50, between the plate 50 and sleeve 30, between the shaft 10 and sleeve 30, and between the shaft 10 and base cover 20. That is, by an uninterrupted full fill of the space in which the fluid can be injected, an adequate circulation may be obtained between the fluids, and the pressures of the fluids may be kept uniform.

Next, a description will be given on the operation of a motor according to this embodiment.

Drawing (a) of FIG. 3 is a cross-sectional view illustrating the cap bearing 73 when a motor according to this embodiment is not being operated, and drawing (b) is a cross-sectional view illustrating the cap bearing 73 when the motor according to this embodiment is in operation.

When the motor according to this embodiment is operated, the hub 60, shaft 10, and plate 50 may undergo rotating motion. Here, the plate 50 may be made to rise, which causes the gap between the plate 50 and the sleeve 30 to increase, and a portion of the oil in the cap bearing 73 may be drawn into the gap between the plate 50 and the sleeve 30.

This may cause the radial seal 75 to also move towards the outer perimeter of the plate 50, which may lead to the sealing effect being improved in preventing the leaking of oil.

Moreover, since a centrifugal force is also applied on the oil due to the rotating movement, the sealing effect may be improved even more.

The oil that has moved to the concavely curved surface of the cap may be made to apply pressure, due to gravity, in a direction that suppresses the rising of the plate. Thus, unstable operation, which may occur due to the rising of the plate, may be prevented.

In addition, the attraction between the permanent magnets coupled to the end portions of the hub and the magnets 97 interposed in proximity to the permanent magnets may suppress the rising of the plate. Thus, unstable operation which may occur due to the rising of the plate may further be prevented.

As set forth above, a motor according to an embodiment of the claimed invention may offer high stability and an increased sealing effect, by forming a radial seal between a protrusion and the plate surface that prevents leaking in the fluid bearing and by forming a contiguous hole in the sleeve.

While the spirit of the invention has been described in detail with reference to particular embodiments, the embodiments are for illustrative purposes only and do not limit the invention. In addition, numerous embodiments besides those set forth above are encompassed in the claimed invention. It is to be appreciated that those skilled in the art can change or modify the embodiments without departing from the scope and spirit of the invention.

What is claimed is:

1. A motor comprising:
   a sleeve having a penetration hole formed therein;
   a shaft configured to be inserted in the penetration hole;
   a plate coupled to the shaft to support the shaft;
   a cap to cover an upper surface of the plate to form a predetermined space between the plate and the cap;
   fluid placed in the space between the plate and the cap;
   a protrusion formed at a portion of the cap towards the place such that an end portion of the cap is inclined; and
   a radial seal formed at the inclined portion of the cap to prevent leakage of the fluid,
   wherein the protrusion is made with a convexly curved surface, and the protrusion and the inner perimeter of the cap are connected by a curved surface.

2. The motor of claim 1, wherein
   the plate has a first hole corresponding to a cross-section of the shaft and has a donut shape, the plate being configured to be coupled with the shaft such that the shaft is inserted in the first hole and configured to be mounted on one side of the sleeve.

3. The motor of claim 2, wherein the cap further covers an outer perimeter of the plate.

4. The motor of claim 3, wherein the sleeve comprises a ledge such that a portion of the side of the sleeve on which the plate and the cap are mounted is sunken in.

5. The motor of claim 3, wherein the sleeve comprises a ledge such that a portion of the side of the sleeve on which the plate and the cap are mounted is protruded out.

6. The motor of claim 1, wherein an inner perimeter of the cap includes a concavely curved surface.

7. The motor of claim 1, further comprising a base cover to cover a lower side of the shaft.

8. The motor of claim 7, further comprising fluid filled continuously in a space extending between the cap and the plate, the plate and the sleeve, the sleeve and the shaft, and the shaft and the base cover.

9. The motor of claim 7, wherein the base cover includes a material configured to be elastically deformed by pressing to touch the sleeve or the shaft.

10. The motor of claim 1, wherein a first thrust bearing is placed in a gap between the plate and the sleeve, the first thrust bearing connected to the fluid in the space between the plate and the cap.

11. The motor of claim 10, further comprising a base cover covering a lower side of the sleeve,
    wherein a radial bearing connected to the first thrust bearing is placed in a gap between the sleeve and the shaft, and
    a second thrust bearing connected to the radial bearing is placed in a gap between the sleeve and the base cover.

12. The motor of claim 11, further comprising a contiguous hole connecting the first thrust bearing and the second thrust bearing.

13. The motor of claim 12, wherein the contiguous hole is formed to penetrate the sleeve.

14. The motor of claim 12, wherein the sleeve comprises an inner sleeve having the contiguous hole formed therein and an outer sleeve coupled to an outer perimeter of the inner sleeve to house the inner sleeve, and
    the contiguous hole is formed in a gap between the inner sleeve and the outer sleeve.

15. The motor of claim 12, wherein the sleeve comprises an inner sleeve having the contiguous hole formed therein and an outer sleeve coupled to an outer perimeter of the inner sleeve to house the inner sleeve, and
    the contiguous hole is formed in the outer sleeve.

16. The motor of claim 15, wherein the contiguous hole comprises a conduit formed in an inner perimeter of the outer sleeve in a longitudinal direction.

* * * * *